United States Patent
Stoia et al.

(10) Patent No.: US 10,752,088 B2
(45) Date of Patent: Aug. 25, 2020

(54) INFOTAINMENT SYSTEM WITH AIR-VENT CONTROL

(71) Applicant: Tesla, Inc., Palo Alto, CA (US)

(72) Inventors: Jonathan Stoia, Santa Clara, CA (US); Christopher Berthelet, Berkeley, CA (US)

(73) Assignee: Tesla, Inc., Palo Alto, CA (US)

( * ) Notice: Subject to any disclaimer, the term of this patent is extended or adjusted under 35 U.S.C. 154(b) by 50 days.

(21) Appl. No.: 15/374,035

(22) Filed: Dec. 9, 2016

(65) Prior Publication Data

US 2018/0162199 A1 Jun. 14, 2018

(51) Int. Cl.
*B60H 1/00* (2006.01)
*B60H 1/34* (2006.01)

(52) U.S. Cl.
CPC ..... *B60H 1/00985* (2013.01); *B60H 1/00757* (2013.01); *B60H 1/00871* (2013.01); *B60H 1/345* (2013.01); *B60H 1/3421* (2013.01); *B60H 2001/3471* (2013.01)

(58) Field of Classification Search
CPC ............ B60H 1/00985; B60H 1/00757; B60H 1/0087; B60H 1/3421; B60H 1/345; B60H 2001/3471
USPC ...................................................... 454/155
See application file for complete search history.

(56) References Cited

U.S. PATENT DOCUMENTS

| 5,364,303 A | 11/1994 | Terry | |
|---|---|---|---|
| 2002/0094774 A1* | 7/2002 | Demerath | B60H 1/345 454/320 |
| 2003/0050001 A1* | 3/2003 | Kamio | B60H 1/345 454/155 |

(Continued)

FOREIGN PATENT DOCUMENTS

| DE | 19943822 | 3/2001 |
|---|---|---|
| DE | 202016103388 | 7/2016 |

(Continued)

OTHER PUBLICATIONS

International Searching Authority; International Search Report and Written Opinion; International Application No. PCT/US2017/058015; dated Mar. 21, 2018; 14 pgs.

(Continued)

*Primary Examiner* — Steven B McAllister
*Assistant Examiner* — Allen R Schult
(74) *Attorney, Agent, or Firm* — Knobbe, Martens, Olson & Bear, LLP

(57) ABSTRACT

An air vent assembly includes a cover member having an inlet for allowing a flow of air to enter the cover member. The cover member also has a vent extending from the inlet for allowing a flow of air to exit the cover member. The vent includes a first vent portion, and a second vent portion located adjacent to the first vent portion. The first vent portion has a first set of flow guiding vanes disposed therein. The second vent portion has a second set of flow guiding vanes disposed therein. Each of the vanes is spaced apart from one another and pivotally coupled to a pair of opposing (Continued)

walls of the cover member. The first and second sets of flow guiding vanes are independently moveable with respect to each other using an actuating mechanism for providing a variety of flow-guiding positions one of which includes a split flow-guiding position.

20 Claims, 15 Drawing Sheets

(56) References Cited

U.S. PATENT DOCUMENTS

| | | | |
|---|---|---|---|
| 2007/0037505 A1 | 2/2007 | Wang | |
| 2010/0163633 A1* | 7/2010 | Barrett | B60H 1/00871 236/49.3 |
| 2015/0094862 A1 | 4/2015 | Choi et al. | |

FOREIGN PATENT DOCUMENTS

| | | |
|---|---|---|
| JP | 61-63641 | 4/1986 |
| JP | 61-98940 | 6/1986 |
| JP | 04-82647 | 7/1992 |
| JP | 05-40007 | 5/1993 |
| JP | 11-83152 | 3/1999 |
| JP | 2002293133 | 10/2002 |
| JP | 2007-170693 | 7/2007 |
| JP | 2015-009615 | 1/2015 |
| JP | 2016-032958 | 3/2016 |

OTHER PUBLICATIONS

International Searching Authority; Annex to the invitation to pay additional fees and provisional opinion; International Application No. PCT/US2017/058015; dated Jan. 31, 2018; 6 pgs.

* cited by examiner

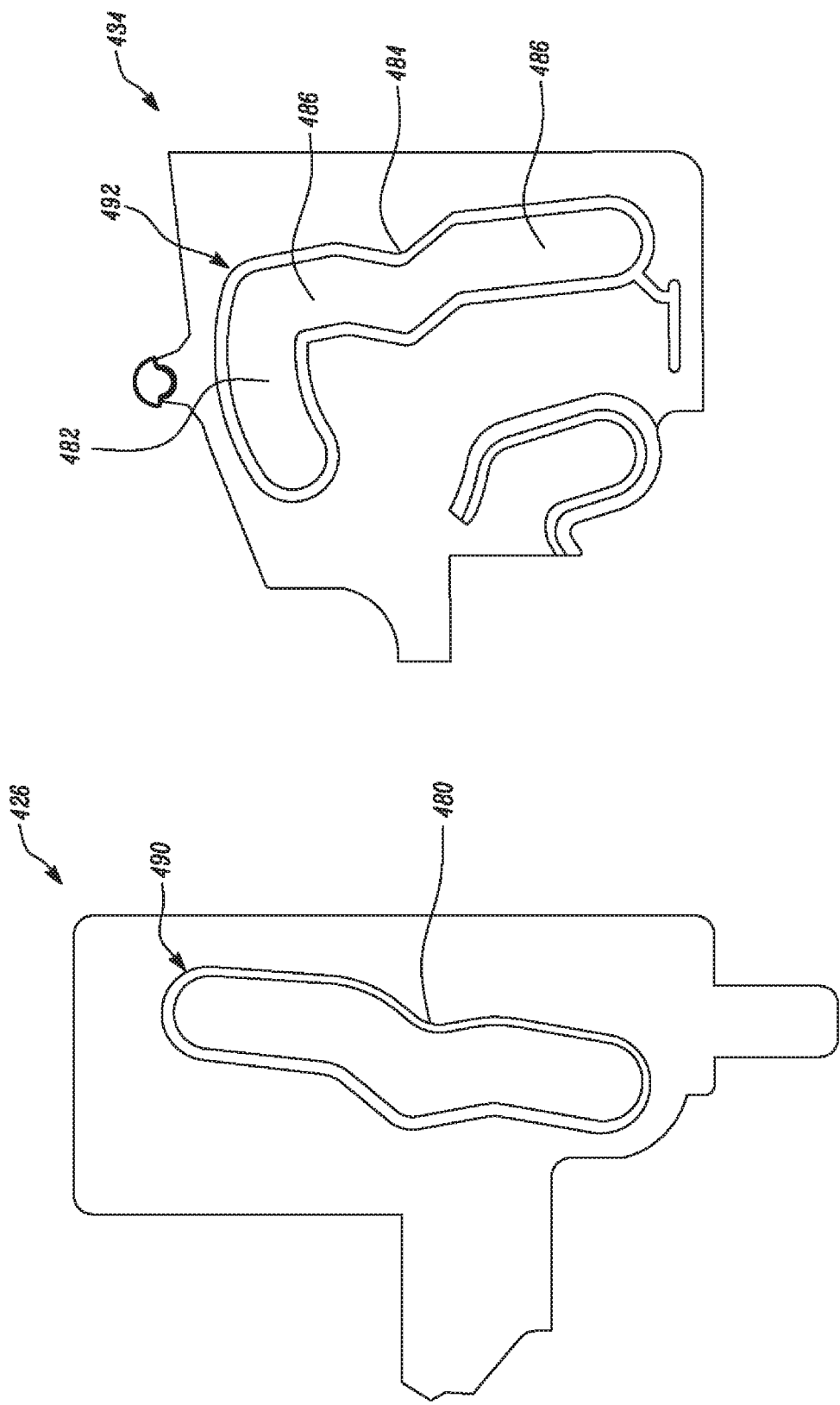

INFOTAINMENT SYSTEM WITH AIR-VENT CONTROL

TECHNICAL FIELD

The present disclosure relates to an infotainment system that controls operation of an HVAC system in order to control air flow within a cabin space of a vehicle. More particularly, the present disclosure relates to an air vent assembly of an HVAC system that can be electronically controlled using an infotainment system.

BACKGROUND

It is well known in the art to provide an air vent assembly for delivering air from an HVAC system to a cabin space of a vehicle. In many cases, conventional air vent assemblies lack choices of desired air flow to ensure driver and passenger comfort when seated within the cabin space of the vehicle. Also, in other cases, many traditionally known air vent assemblies are typically controlled with input devices including, but not limited to, physical buttons and/or knobs thus making operation of the air vent assembly dependent upon a proper working condition of such input devices. However, as air flow within the vehicle is an important aspect to creating a comfortable environment for the driver and passengers of the vehicle, ensuring the reliability of the HVAC system, and in particular, a reliability of the air vent assembly may be desired. In addition, traditionally, vehicles have multiple vents for each of the driver and/or passenger. However, dashboard space is often at a premium due to other considerations, such as a larger windshield or room for meters.

Hence, there is a need for an air vent assembly that overcomes one or more of the aforementioned drawbacks. Further, there is need for improved control of the air vent assembly through an infotainment system which allows for easy and intuitive control to facilitate the desired condition of the cabin space within the vehicle.

BRIEF DESCRIPTION OF THE FIGURES

FIG. 14B illustrates a cam-groove geometries for the first and second actuating members pursuant to the air vent assembly of FIG. 4 according to certain embodiments of the invention.

Figure 1:
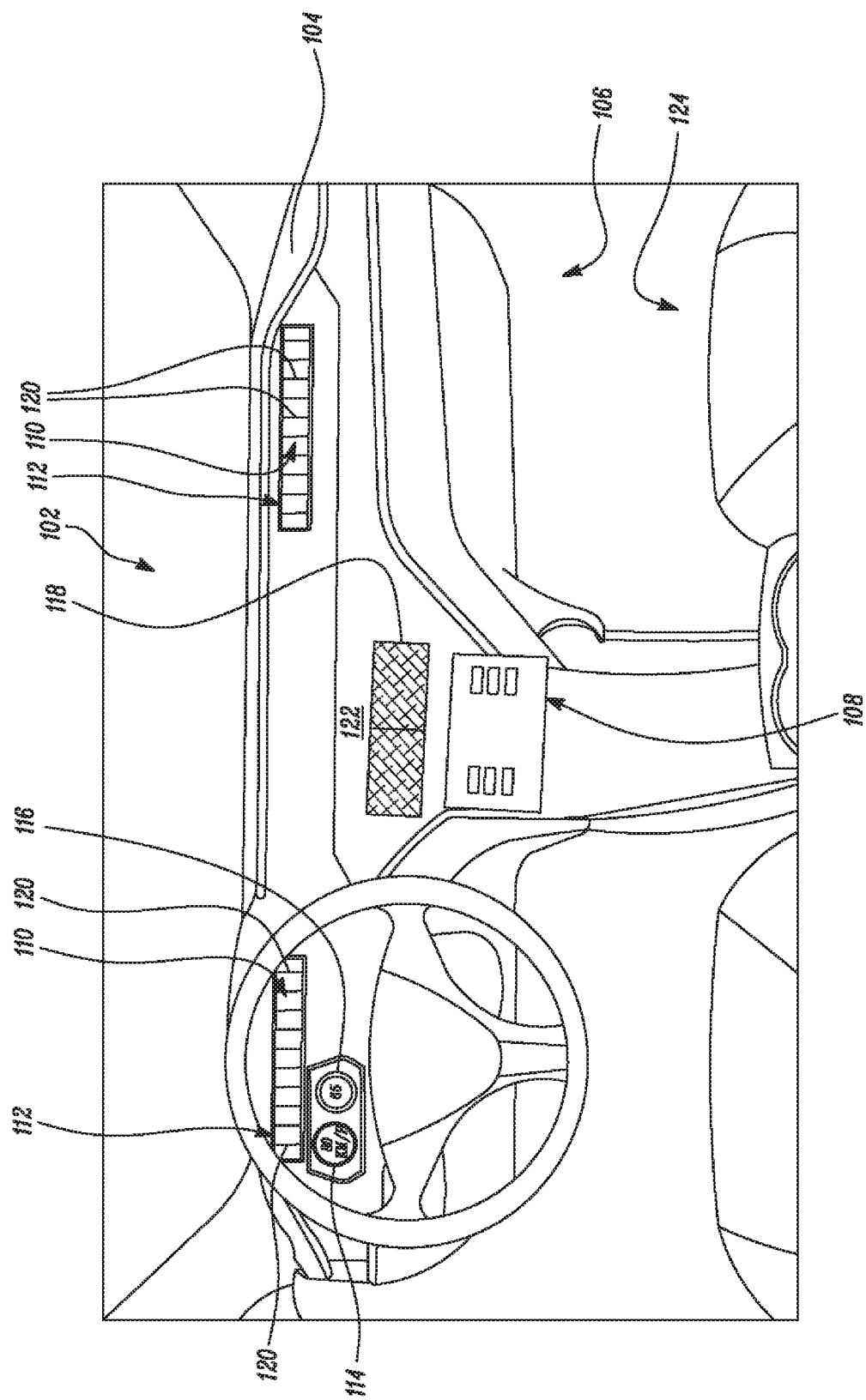
FIG. 1 illustrates an interior of a vehicle showing the air vent assembly of an HVAC system that is capable of being controlled by an infotainment system according to certain embodiments of the invention.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure relates to air vent assemblies. More particularly, the present disclosure relates to a particular air vent assembly and an infotainment system that controls an HVAC system, including the air vent assembly, in order to control air flow within a cabin space of a vehicle.

The air vent assembly according to the present disclosure introduces a new way of delivering airflow to a user. According to certain embodiments, the air vent assembly includes a first vent portion placed in front of the driver and a second vent portion that is placed in front of the passenger. These vent portions may be elongated as compared to traditionally known designs of air vent assemblies in that they have longer, more linear vents instead of more circular or boxy vents. Also, each of the vent portions from the air vent assembly of the present disclosure typically includes more than one vent for each of the driver and passenger.

Embodiments of the present disclosure enhance the capabilities of this air vent assembly to provide air flow in a leftward, rightward, onward, and a split configuration using a single rotary actuator. In certain embodiments, the user interface may also allow a user to define the degree to which the vents may cause air to flow in the rightward, leftward, or split direction. In certain other embodiments, the infotainment display may be configured to provide pre-defined degrees of movement to the vents for causing air to flow around the driver or passenger.

According to certain embodiments, the driver and/or the passenger may control the vents using menu options provided on the user interface of the infotainment device. Some of the menu options provided on the user interface when actuated may configure the rotary actuator to close the vents, or cause the vents to accomplish a rightward air flow, a leftward air flow, an onward air flow, or a split air flow.

According to certain embodiments, the air vent assembly includes an actuating mechanism having a single rotary actuator therein for controlling a pair of actuating members—a first actuating member and a second actuating member. Each actuating member can control half of the vanes, although in certain other embodiments, each actuating member may control more or less than half of the vanes provided in the vent portions of the air vent assembly. Using the pair of actuating members together with the single rotary actuator, the vanes can be rotated about their respective rotational axes to close, or cause air to flow in the leftward, rightward, onward, or a split flow configuration in which flow of air is directed around the driver and/or the passenger of the vehicle. In certain embodiments, the user customizes the airflow, for example, the specific direction of the airflow. This can allow for a more comfortable experience for the occupants of a vehicle. For example, certain occupants may desire for air to be directed towards themselves while other occupants may desire the temperature of the vehicle cabin to be set to a certain value without having air directly impinging on themselves.

According to certain embodiments, the actuating mechanism includes a cam member that is rotatively driven by the rotary actuator in a range of 180 degrees, which in other embodiments could include other ranges of angular motion for accomplishing a movement of the vanes in their respective vane-closeout position, leftward flow guiding position, onward flow guiding position, rightward flow-guiding position, and a split flow-guiding position.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 illustrates an interior 102 of a vehicle 100 according to certain embodiments of the invention. As shown, a dash console 104 is disposed in an anterior region 106 of the vehicle 100. The dash console 104 is configured to provide a host of spaces for fitment of various devices including, but not limited to, an infotainment device 108, an air vent assembly 112 of an HVAC system 110, a speedometer 114, an odometer 116, a stereo system 118, and other like devices provided to the vehicle 100 depending on specific requirements of a vehicular application.

Embodiments of the present disclosure are directed to the air vent assembly 112 of the HVAC system 110 and the infotainment device 108 that is configured to operatively control, amongst other things, the movement of vanes 120 in the air vent assembly 112 of the HVAC system 110.

Figure 2:
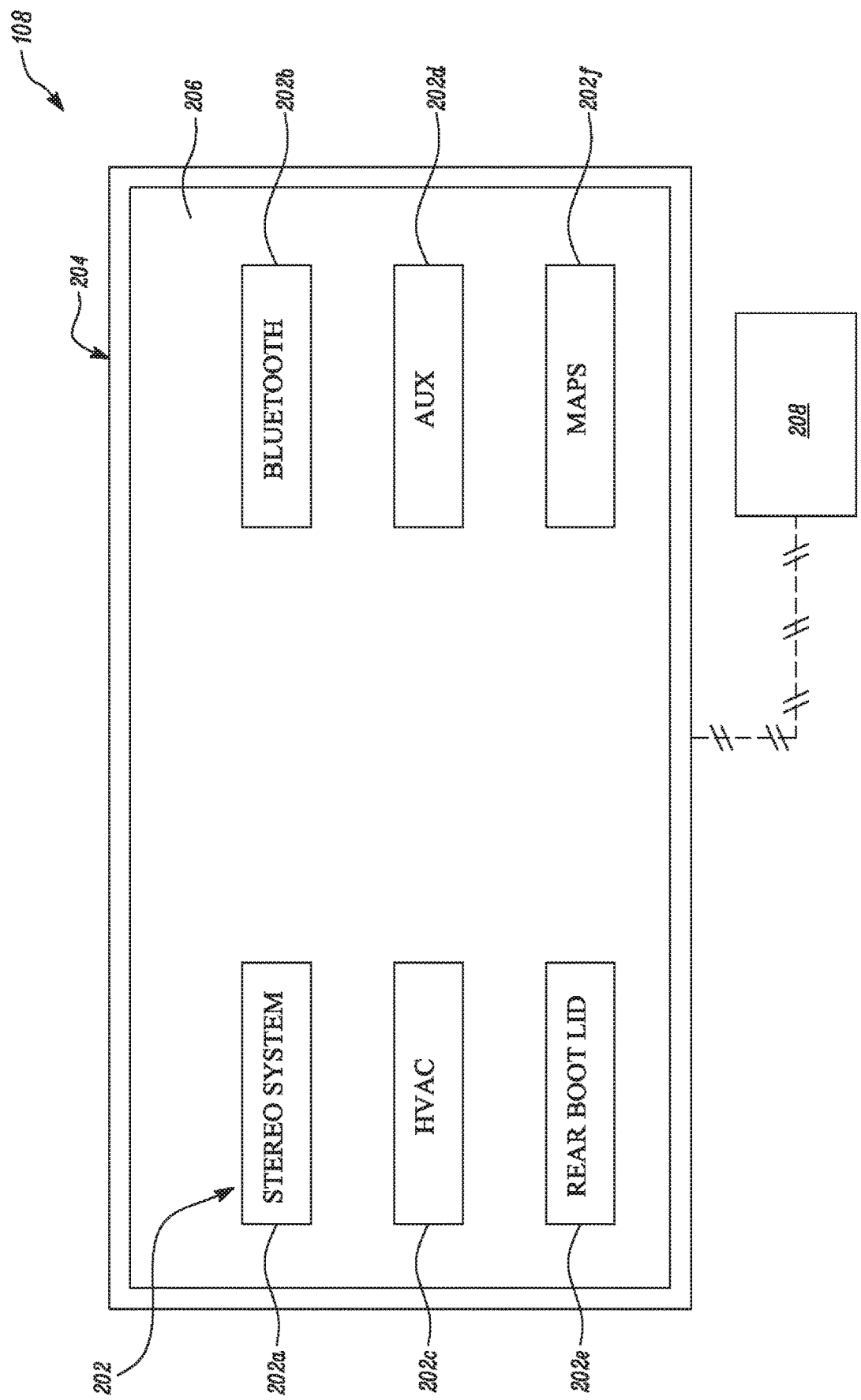
FIG. 2 illustrates an interface of the infotainment system showing a variety of high-level menu options according to certain embodiments of the invention.

FIG. 2 illustrates an interface 206 of the infotainment device 108 showing a variety of high-level menu options 202 according to certain embodiments of the invention. Each of the menu options 202 is provided on the user interface 206 of a display 204 associated with the infotainment device 108. This way, a user may select an appropriate menu option 202 on the user interface 206 of the infotainment device 108. Consequently, a processor 208 of the infotainment device 108 detects the menu option 202 that is being selected by the user and provides appropriate control signals to a desired device present in the vehicle 100 and corresponding with the selected menu option 202 so that an operation of the desired device is controlled. As disclosed earlier in this embodiment, the user input is provided by selecting from the menu options 202 listed on the user interface 206. According to certain other embodiments of this invention, the user can provide a voice command to the user interface 206 in lieu of physically selecting a menu option to control the air flow in vehicle 100.

As shown in the illustrated embodiment of FIG. 2, a host of high-level menu options 202 are shown provided on the user interface 206 of the infotainment device 108. Each of these high-level menu options 202 are user selectable for controlling an operation of the desired device. For example, as shown in FIG. 2, a menu option 202a when selected may be configured to direct the processor 208 to turn ON the stereo system 118. Likewise, a menu option 202b when selected may be configured to direct the processor 208 to turn ON a Bluetooth device while a menu option 202c when selected by the user would direct the processor 208 to open a rear boot lid of the vehicle 100. Similarly, a menu option 202d when selected may configure the processor 208 to turn ON the HVAC system 110 of the vehicle 100. Other menu options including, but not limited to, the menu options 202e and 202f may, additionally or optionally, be provided on the user interface 206 to facilitate AUX input at the stereo system 118 and enable navigation maps at the user interface 206 itself respectively.

It may be noted that the processor 208 may be a single microprocessor or multiple microprocessors that include components for performing functions consistent with the present disclosure. Numerous commercially available microprocessors can be configured to perform the functions of the processor 208 disclosed herein. It should be appreciated that the processor 208 could readily be embodied in a general purpose microprocessor capable of controlling numerous functions associated with each of the devices present in the vehicle 100. The processor 208 may also include a memory, a secondary storage device, and any other components for running an application. Various circuits may be associated with the processor 208 such as power supply circuitry, a solenoid driver circuitry, a signal conditioning circuitry for e.g., an analog-to-digital converter circuitry, and other types of circuitry. Various routines, algorithms, and/or programs can be programmed within the processor 208 for execution thereof. Moreover, it should be noted that the processor 208 disclosed herein may be a stand-alone processor 208 or may be configured to co-operate with existing processor/s, for example, an electronic control module (ECM) (not shown) provided to the vehicle 100 to perform functions that are consistent with the present disclosure.

Figure 3:
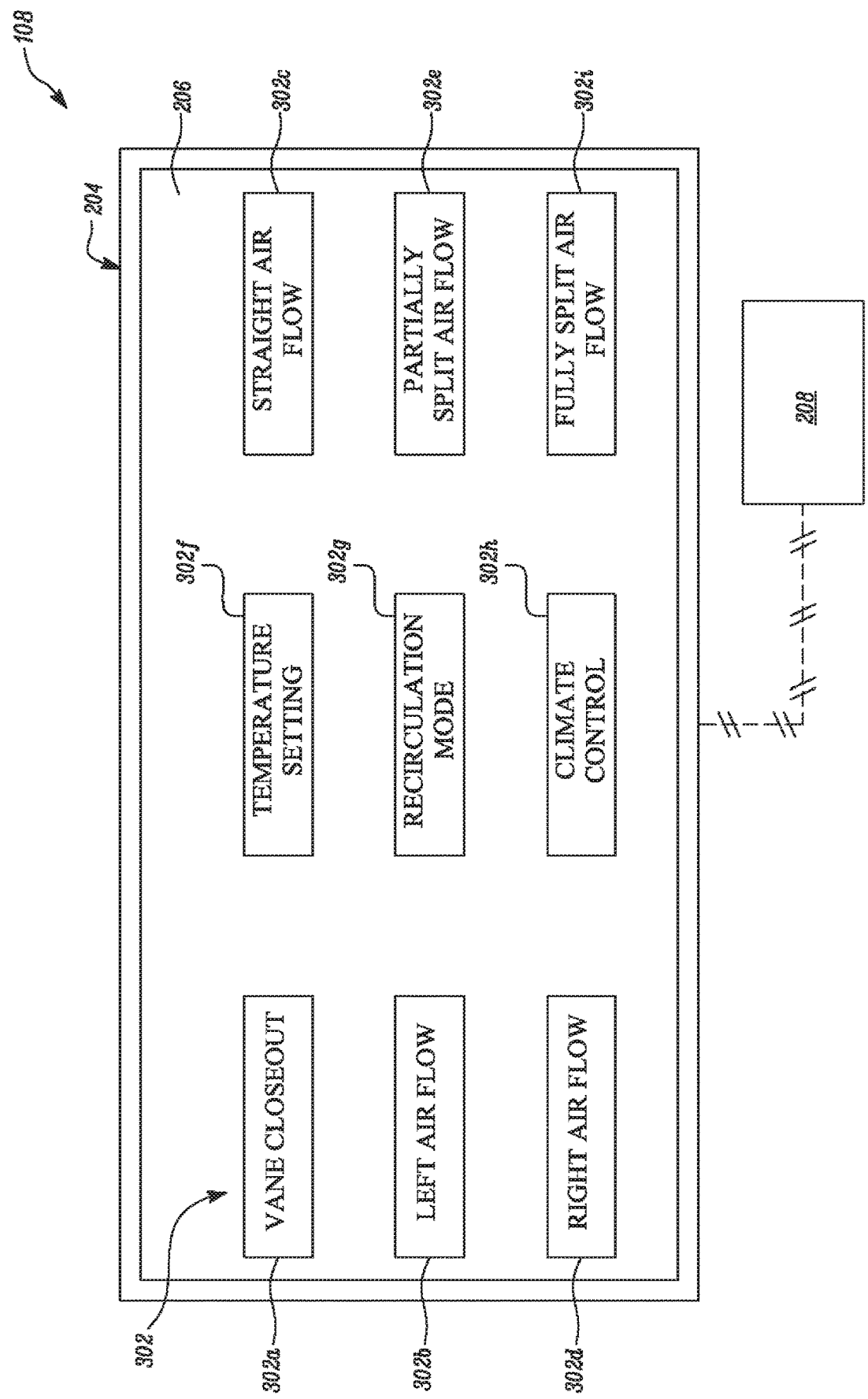
FIG. 3 illustrates an interface of the infotainment system showing a variety of low-level menu options for controlling the HVAC system according to certain embodiments of the invention.

Referring to FIG. 3, a host of low-level menu options 302 are displayed on the user interface 206 of the infotainment device 108 in accordance with certain embodiments of the invention. In particular, the low-level menu options 302 shown in FIG. 3 may be displayed on the user interface 206 in response to the user having previously selected the HVAC menu option 202d listed in the high-level menu options 202 from FIG. 2. As shown in FIG. 3, the low-level menu options 302 may include, but are not limited to, a temperature setting menu option 302f, a menu option 302g for enabling a recirculation mode of air conditioning in the vehicle 100, a menu option 302h for enabling climate control in the vehicle 100.

According to specific embodiments of this invention, at least some low-level menu options 302 are additionally provided to a user for particularly controlling the vanes 120 of the air vent assembly 112. As shown in FIG. 3, these low-level menu options 302 include a menu option 302a for directing the vanes 120 to move to a vane closeout position, a menu option 302b for directing the vanes 120 to move to a leftward flow-guiding position, a menu option 302c for directing the vanes 120 to move to an onward flow-guiding position, a menu option 302*d* for directing the vanes 120 to a rightward flow-guiding position, a menu option 302*e* for directing the vanes 120 of the air vent assembly 112 to a partially-split flow-guiding position, and another menu option 302*i* for directing the vanes 120 of the air vent assembly 112 to a fully-split flow-guiding position.

Referring back to FIG. 1, an air vent assembly 112 is shown typically disposed in front of the driver seat and front-passenger seat on the dash console 104. Therefore, references to the flow-guiding positions of the vanes 120 such as closeout, leftward, rightward, onward, and split are to be construed as being taken in relation to the seats or occupants of the vehicle 100 who would typically be located in a front portion 124 of the vehicle 100. Additional detail for each of the aforementioned flow-guiding positions appears below in the detailed description of the other figures.

Moreover, although it is disclosed in the illustrated embodiment of FIG. 1 that two air vent assemblies are disposed on the dash console 104—one in front of the driver seat and one in front of the passenger seat—it may be noted that the number and position of the air vent assembly 112 or assemblies within the interior 102 of the vehicle 100 is non-limiting of this invention. Other alternative positions within the interior 102 of the vehicle 100 may include, but is not limited to, the center of the console, a right inner side of the vehicle 100, a left inner side of the vehicle 100, a top inner side of the vehicle 100, or stretching from the right side of the vehicle 100 to the left side of the vehicle 100. Such alternative positions may be contemplated depending on specific requirements of a vehicular application.

Figure 4:
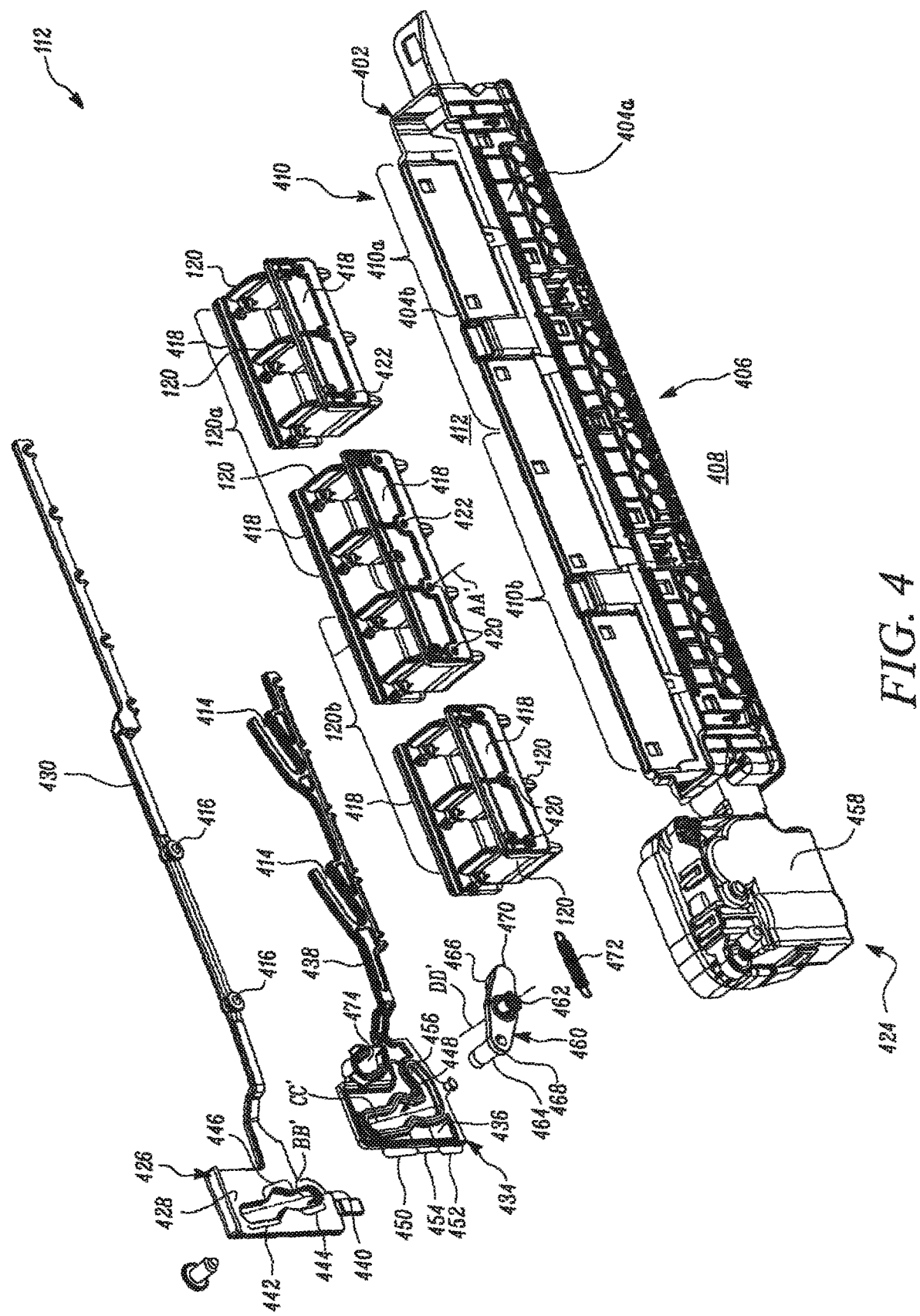
FIG. 4 illustrates an exploded top perspective view of an air vent assembly of the HVAC system according to certain embodiments of the invention.
Figure 5:
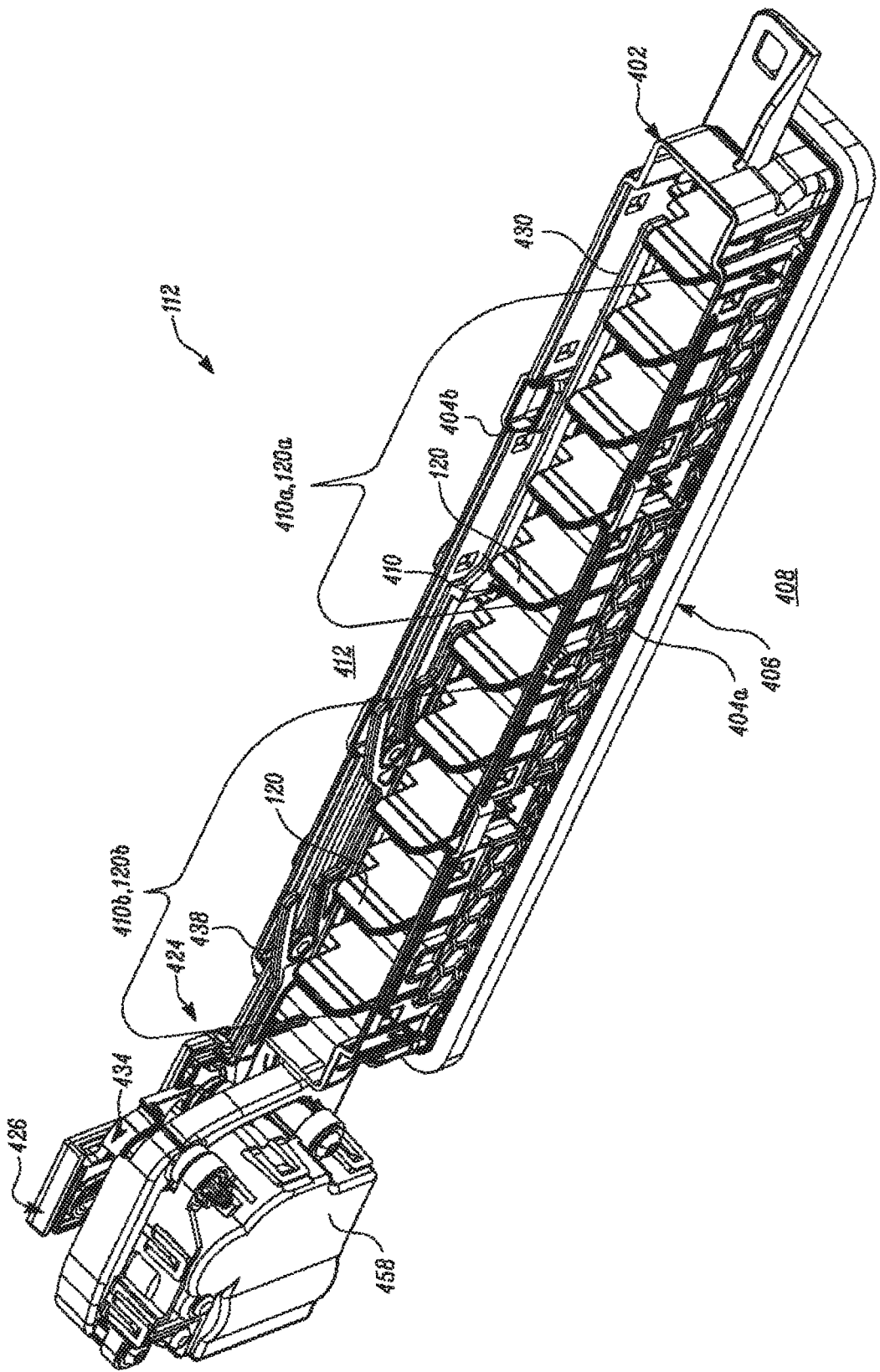
FIG. 5 illustrates an assembled top perspective view of the air vent assembly according to certain embodiments of the invention.

FIG. 4 shows an exploded top perspective view of the air vent assembly 112 in accordance with certain embodiments of this invention. As shown, the air vent assembly 112 includes a cover member 402. An outer shape and size of the cover member 402 may be selected so as to correspond with a size and shape of a space provided by the dash console 104 of the vehicle 100 (refer to FIG. 1). In instances where the air vent assembly 112 is to be installed in a location other than the space provided by the dash console 104, for example, the left inner side, the right inner side, or the top inner side of the vehicle 100, the outer size and shape of the cover member 402 may be suitably selected to correspond with a size and shape of that space.

With continued reference to FIG. 4, the cover member 402 has a pair of elongated walls 404*a* and 404*b* disposed in an opposing relation to one another. The cover member 402 has an inlet 406 defined on an aft side 408 thereof. The inlet 406 allows a flow of air to enter the cover member 402, particularly, when the HVAC system 110 is turned ON in response to the user input at the interface being indicative of the HVAC menu option 202*d*.

The cover member 402 also has a vent 410 extending from the inlet 406 toward a fore side 412 of the cover member 402. The vent 410 is configured to allow a flow of air to exit the cover member 402. The vent 410 consists of a first vent portion 410*a* and a second vent portion 410*b* located adjacent to the first vent portion 410*a*. As shown, the first vent portion 410*a* has vanes 120 disposed therein. For purposes of simplicity, the vanes 120 from the first vent portion 410*a* are hereinafter referred to as 'the first set of flow-guiding vanes' and denoted with like alpha-numeral '120*a*'. Likewise, the second vent portion 410*b* has a second set of flow-guiding vanes disposed therein, which for purposes of simplicity and differentiation from the first set of flow-guiding vanes 120*a* is denoted with like alpha-numeral '120*b*'.

In the illustrated embodiment of FIG. 4, the first set of flow-guiding vanes 120*a* is shown to consist of five vanes 120. Likewise, the second set of flow-guiding vanes 120*b* consists of five vanes 120 therein. It may be noted that a number and distribution of vanes 120 between the first and second sets of flow-guiding vanes 120*a*, 120*b* is merely a matter of design choice and hence, the number and distribution of vanes 120 between the first and second sets of flow-guiding vanes 120*a*, 120*b* may vary from one application to another depending on specific requirements of an application. Moreover, although the number of vanes 120 in the air vent assembly 112 of the present disclosure is limited to five in each of the first and second sets of flow-guiding vanes 120*a*, 120*b*, it will be acknowledged by persons skilled in the art that an unequal number of vanes 120 may be present in the first and second sets of flow-guiding vanes 120*a*, 120*b* depending on specific requirements of an application.

Further, each of the vanes 120 from the first and second set of flow-guiding vanes 120*b* are spaced apart from one another. Moreover, the vanes 120 from the first and second vent portions 410*a*, 410*b* extend at least partially between the aft and fore sides 408, 412 of the cover member 402. Furthermore, each vane 120 from the first and second sets of flow-guiding vanes 120*a*, 120*b* are pivotally coupled to the pair of mutually opposing elongated walls 404*a*, 404*b* of the cover member 402. In the illustrated embodiment of FIGS. 4-7, three sets of cover plates 418 are provided to establish a pivotal connection of each vane 120 from the first and second sets of flow-guiding vanes 120*a*, 120*b* with the pair of mutually opposing elongated walls 404*a*, 404*b* of the cover member 402. As best shown in FIG. 4, each pair of mutually opposing cover plates 418 defines multiple corresponding recesses 420. Each of the recesses 420 on the cover plates 418 receives a pivot pin 422 associated with the vane from either the first or second set of flow-guiding vanes 120*b*.

According to certain embodiments of this invention, the first set of flow-guiding vanes 120*a* and the second set of flow-guiding vanes 120*b* are independently moveable with respect to each other using an actuating mechanism 424 that is coupled to each of the first and second sets of flow-guiding vanes 120*a*, 120*b*. The actuating mechanism 424 includes a first actuating member 426. The first actuating member 426 has a first base portion 428, and a first link member 430 extending from the first base portion 428. The first link member 430 is engaged with each vane 120 from the first set of flow-guiding vanes 120*a*. The first link member 430 is operable to pivot each vane 120 from the first set of flow-guiding vanes 120*a* about its corresponding rotational axis AA'.

Referring to FIGS. 4-7, the actuating mechanism 424 further includes a second actuating member 434 located adjacent to the first actuating member 426. The second actuating member 434 has a second base portion 436 that is disposed below the first base portion 428 of the first actuating member 426. The second actuating member 434 also has a second link member 438 extending from the second base portion 436. The second link member 438 is pivotally engaged with each vane 120 from the second set of flow-guiding vanes 120*b*. The second link member 438 is selectively operable to pivot each vane 120 from the second set of flow-guiding vanes 120*b* about its corresponding rotational axis AA'.

Additionally, the first base portion 428 of the first actuating member 426 defines a first cam groove 440 therein. The first cam groove 440 includes a first portion 442, a second portion 444 spaced-apart from the first portion 442, and a mid-portion 446 disposed between the first and second portions 442, 444. As shown, the mid-portion 446 of the first cam groove 440 is curved away from an axis BB' connecting the first and second portions 442, 444 of the first cam groove 440.

The second base portion 436 of the second actuating member 434 defines a second cam groove 448 therein. The second cam groove 448 includes a first portion 450, a second portion 452 spaced-apart from the first portion 450, and a mid-portion 454 disposed between the first and second portions 450, 452. As shown, the mid-portion 454 of the second cam groove 448 is curved away from an axis CC' connecting the first and second portions 450, 452 of the second cam groove 448. Additionally, the second cam groove 448 includes a third portion 456 extending from a distal end of the second portion 452. The third portion 456 is arcuately disposed in relation to the second portion 452. According to certain embodiments, the first, second, and mid-portions 442-446, 450-454 of the first and second cam grooves 440, 448 correspond with one another. However, it may be noted that other configurations of the first and second cam grooves 440, 448 may be implemented by persons skilled in the art to realize the features of this invention.

The actuating mechanism 424 further includes a rotary actuator 458 communicably coupled with the processor 208 of the infotainment device 108. The actuating mechanism 424 further includes a cam member 460 having a central portion 462 coupled to the rotary actuator 458. The rotary actuator 458 operatively rotates the cam member 460 about its central portion 462 in response to control signal output by the processor 208. The cam member 460 also has a primary pin 464 and a secondary pin 466. The primary pin 464 is disposed at a first end 468 of the cam member 460. The secondary pin 466 is disposed at a second end 470 of the cam member 460. The primary pin 464 is disposed in engagement with the first and second cam grooves 440, 448 from respective ones of the first and second actuating members 426, 434.

Figure 6:
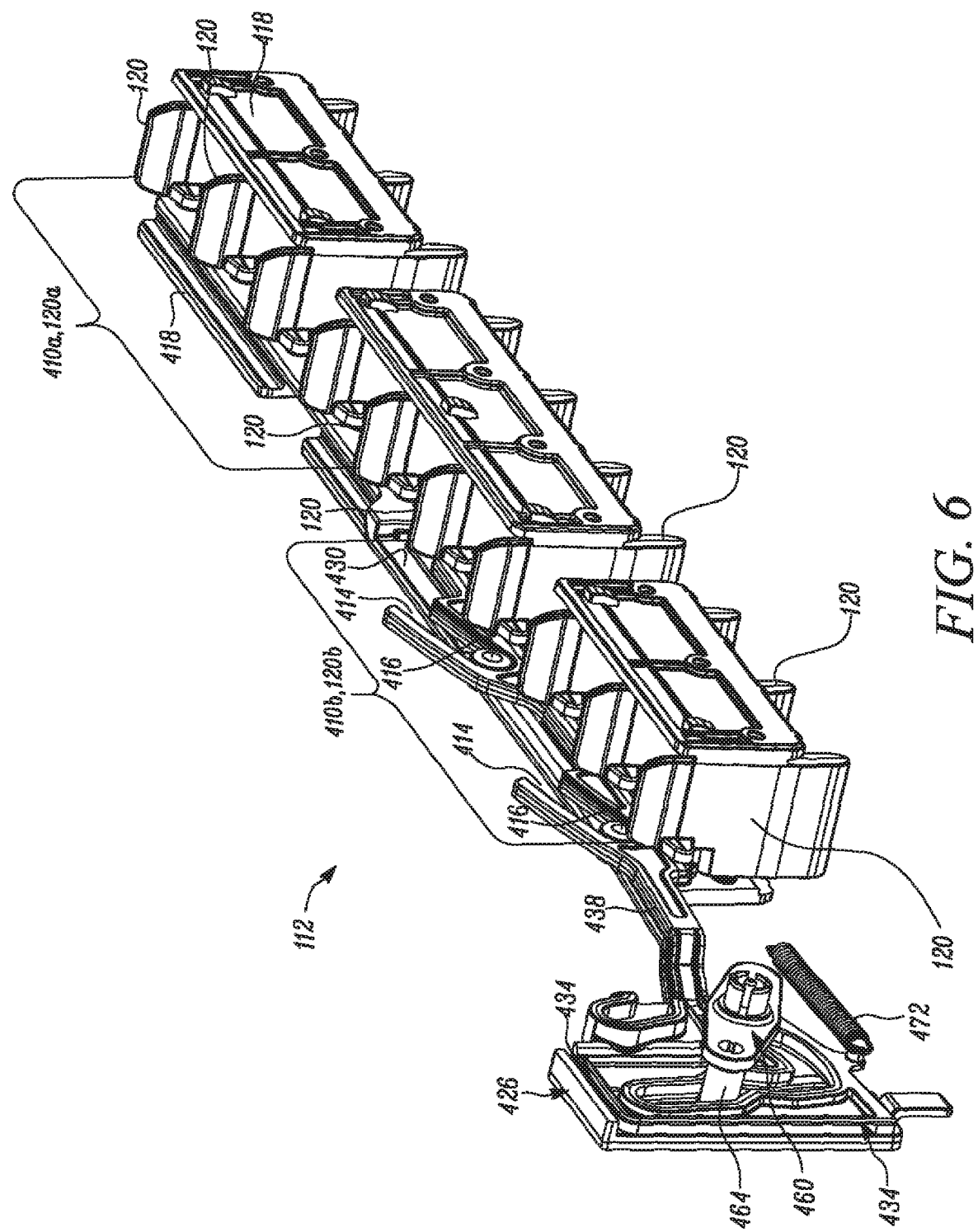
FIG. 6 illustrates a partially assembled top perspective view of the air vent assembly without a cover member according to certain embodiments of the invention.
Figure 7:
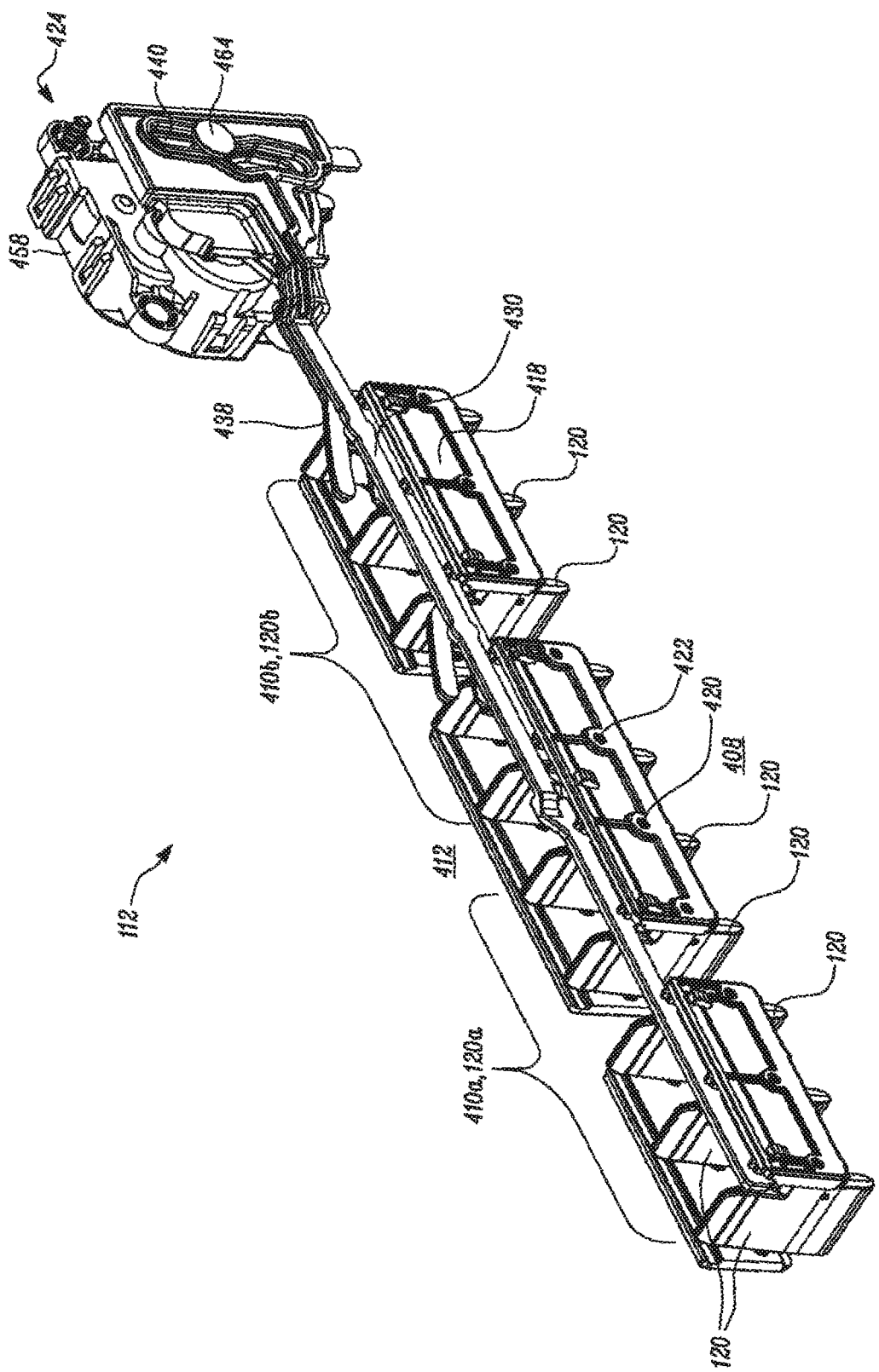
FIG. 7 illustrates a side perspective view of the air vent assembly without the cover member according to certain embodiments of the invention.

Additionally, as best shown in FIG. 6, the second link member 438 of the second actuating member 434 is slidably coupled to the first link member 430 of the first actuating member 426 with the help of a slot-pin arrangement in which each of the slots are denoted by numeral 414 while each of the sliding pins are denoted by numeral 416. Moreover, as best shown in FIG. 6, the second link member 438 may be resiliently biased by a spring 472 coupled to the cover member 402. The spring 472 facilitates a default position for each of the first and second actuating members 426, 434 which in turn would cause the first and second sets of flow-guiding vanes 120a, 120b to be generally disposed in their respective default positions. The spring may assist secondary pin 466 in pulling the to pull the second link member 438 back to a centralized location. Further, when no user input is received at the user interface 206 for turning ON the HVAC system 110 or for effecting a particular flow-guiding position other than the vane closeout position, the default position of the first and second actuating members 426, 434 may be effected by the spring 472 as the spring 472 generally biases the first and second actuating members 426, 434 into their respective default positions, which according to a particular embodiment of this disclosure, is the vane closeout position. Alternatively, it has also been contemplated that when a user input is received vis-à-vis the high-level menu option 202d for turning OFF the HVAC system 110, the spring 472 offers a bias force to each of the first and second actuating members 426, 434 such that the first and second sets of flow-guiding vanes 120a, 120b are disposed in their respective vane closeout positions. It may be noted that the terms 'vane closeout position' disclosed herein may be regarded as a position in which the vanes 120 from the first and second sets of flow-guiding vanes 120a, 120b fully obstruct the flow of air from the air vent assembly 112 towards the interior 102 of the vehicle 100.

According to certain embodiments, a rotation of the cam member 460 about an axis DD' of the central portion 462 causes an engagement of the primary pin 464 with one of the first, second, and mid-portions 442-446, 450-454 of respective ones of the first and second cam grooves 440, 448 for positioning the first and second sets of flow-guiding vanes 120a, 120b in one of: the vane closeout position, the rightward flow-guiding position, the onward flow-guiding position, and the leftward flow-guiding position. Explanation to each of these functions is made in the appended disclosure.

Figure 8:
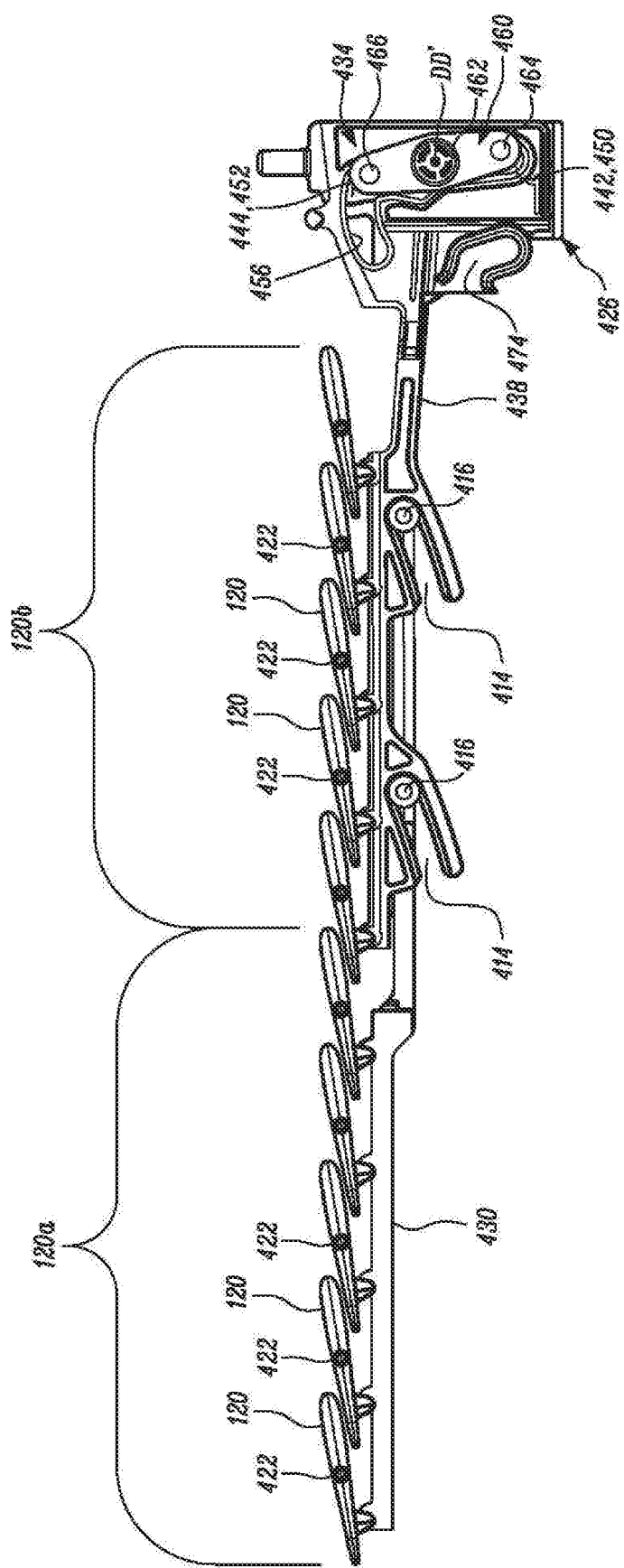
FIG. 8 illustrates a top view of the air vent assembly showing vanes disposed in a vane closeout position according to certain embodiments of the invention.

According to specific embodiments as shown in FIG. 8, when the primary pin 464 of the cam member 460 is operatively moved into engagement with the first portions 442, 450 of respective ones of the first and second cam grooves 440, 448 (refer to FIG. 4) and is located distally away from the mid-portions 446, 454 of respective ones of the first and second cam grooves 440, 448, a corresponding movement of the first and second actuating members 426, 434 causes respective ones of the first and second sets of flow-guiding vanes 120a, 120b to be positioned in their respective vane close-out positions.

Figure 9:
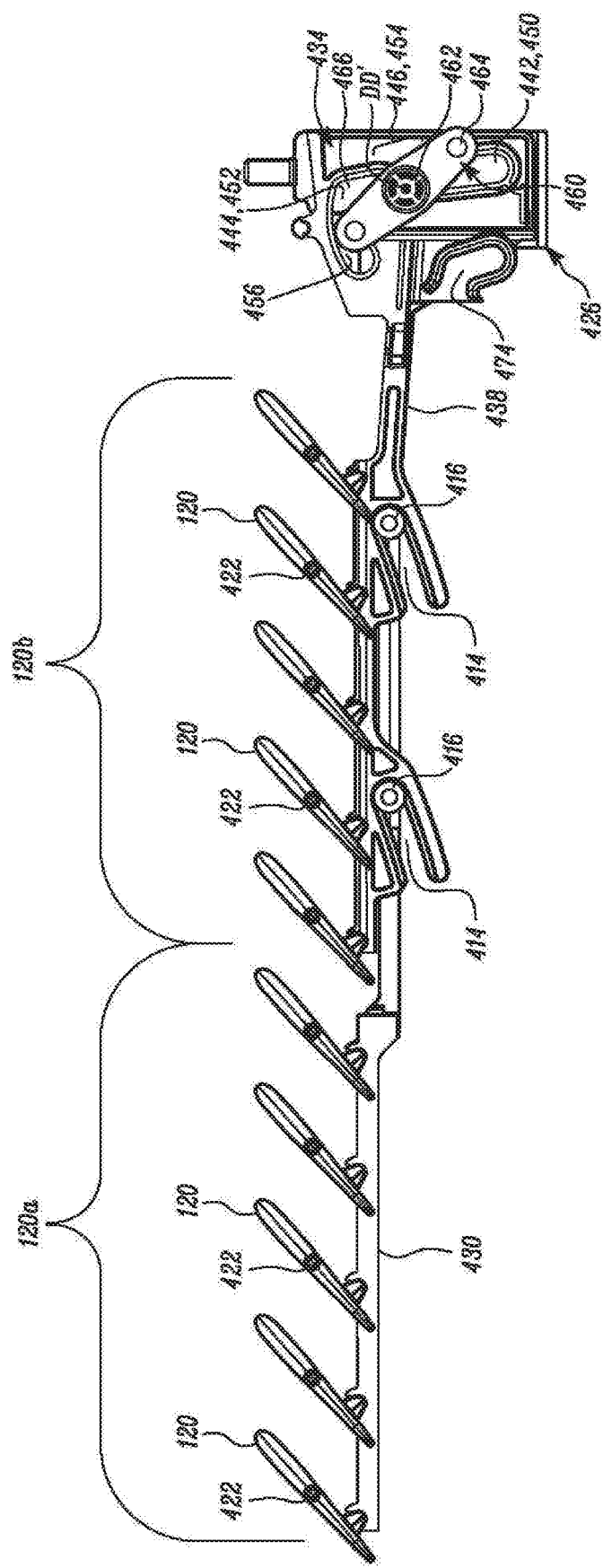
FIG. 9 illustrates a bottom view of the air vent assembly showing vanes disposed in a rightward flow-guiding position according to certain embodiments of the invention.

According to other embodiments as shown in FIG. 9, when the primary pin 464 of the cam member 460 is operatively moved into engagement with the first portions 442, 450 of respective ones of the first and second cam grooves 440, 448 (refer to FIG. 4) so as to be located partway along a length of the first portions 442, 450 of respective ones of the first and second cam grooves 440, 448, a corresponding movement of the first and second actuating members 426, 434 causes respective ones of the first and second sets of flow-guiding vanes 120a, 120b to be positioned in their respective rightward flow-guiding positions. It may be noted that the flow-guiding vanes 120a, 120b as shown in FIG. 9 are pointing in a leftward and downward direction as the view of FIG. 9 is the bottom view of the air vent assembly 112.

Figure 10:
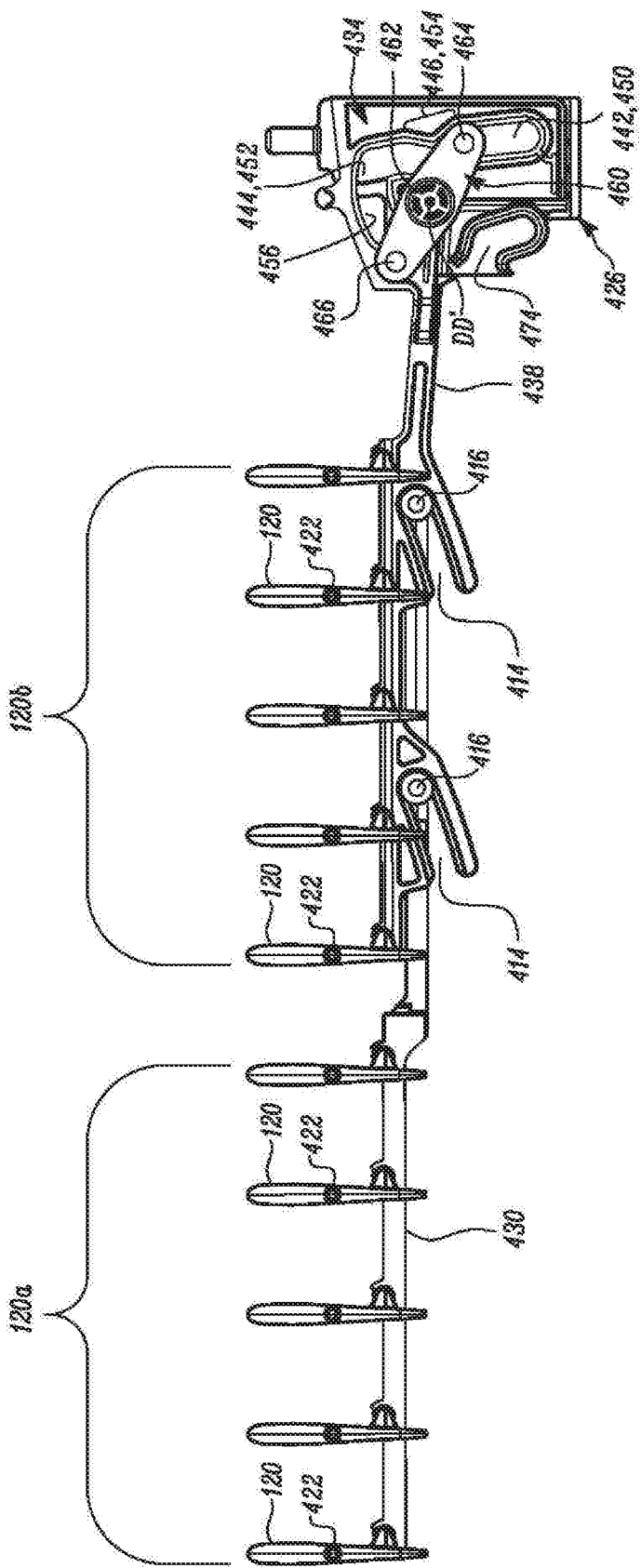
FIG. 10 illustrates a bottom view of the air vent assembly showing vanes disposed in an onward flow-guiding position according to certain embodiments of the invention.

According to other embodiments as shown in FIG. 10, when the primary pin 464 of the cam member 460 is operatively moved into engagement with the first portions 442, 450 of respective ones of the first and second cam grooves 440, 448 (refer to FIG. 4) so as to be located proximal to the mid-portions 446, 454 of respective ones of the first and second cam grooves 440, 448, a corresponding movement of the first and second actuating members 426, 434 causes respective ones of the first and second sets of flow-guiding vanes 120a, 120b to be positioned in their respective onward flow-guiding positions.

Figure 11:
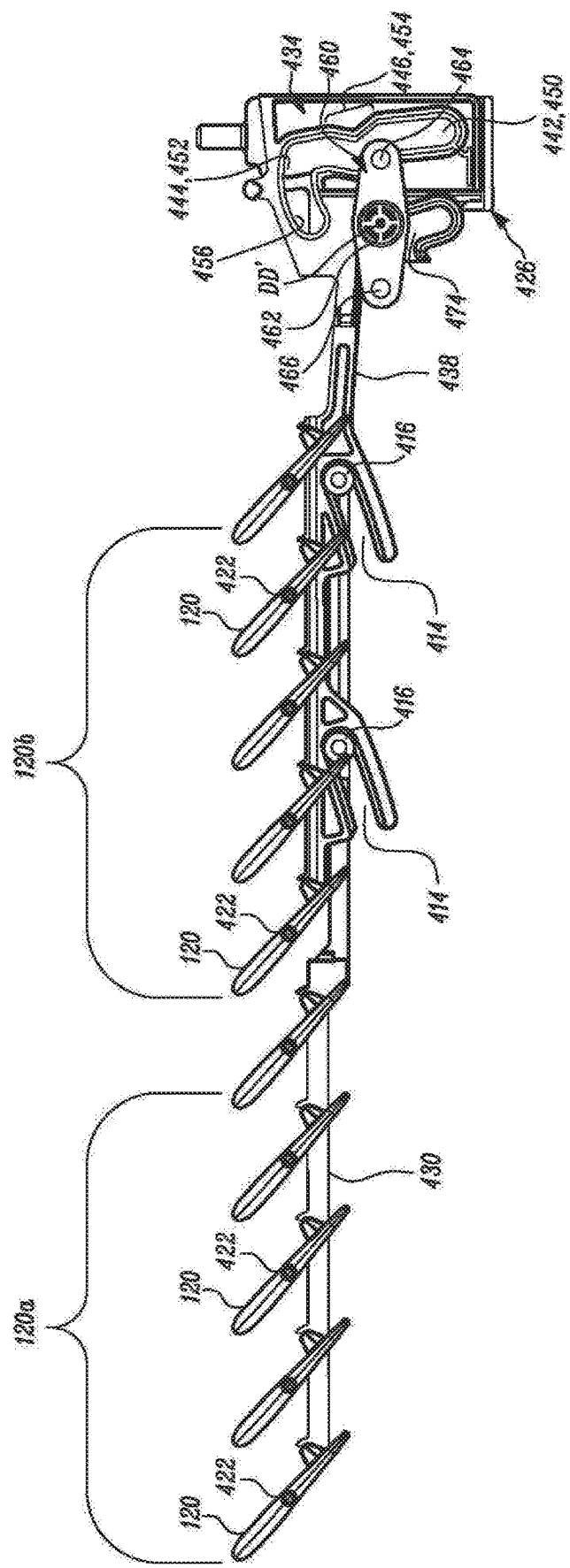
FIG. 11 illustrates a bottom view of the air vent assembly showing vanes disposed in a leftward flow-guiding position according to certain embodiments of the invention.

According to other embodiments as shown in FIG. 11, when the primary pin 464 of the cam member 460 is operatively moved into engagement with the mid-portions 446, 454 of respective ones of the first and second cam grooves 440, 448 (refer to FIG. 4) and is located at a center of the mid-portions 446, 454 of respective ones of the first and second cam grooves 440, 448, a corresponding movement of the first and second actuating members 426, 434 causes respective ones of the first and second sets of flow-guiding vanes 120a, 120b to be positioned in their respective leftward flow-guiding positions. The flow-guiding vanes 120a, 120b as shown in FIG. 11 are pointing in a rightward and downward direction as the view of FIG. 9 is the bottom view of the air vent assembly 112.

Figure 12:
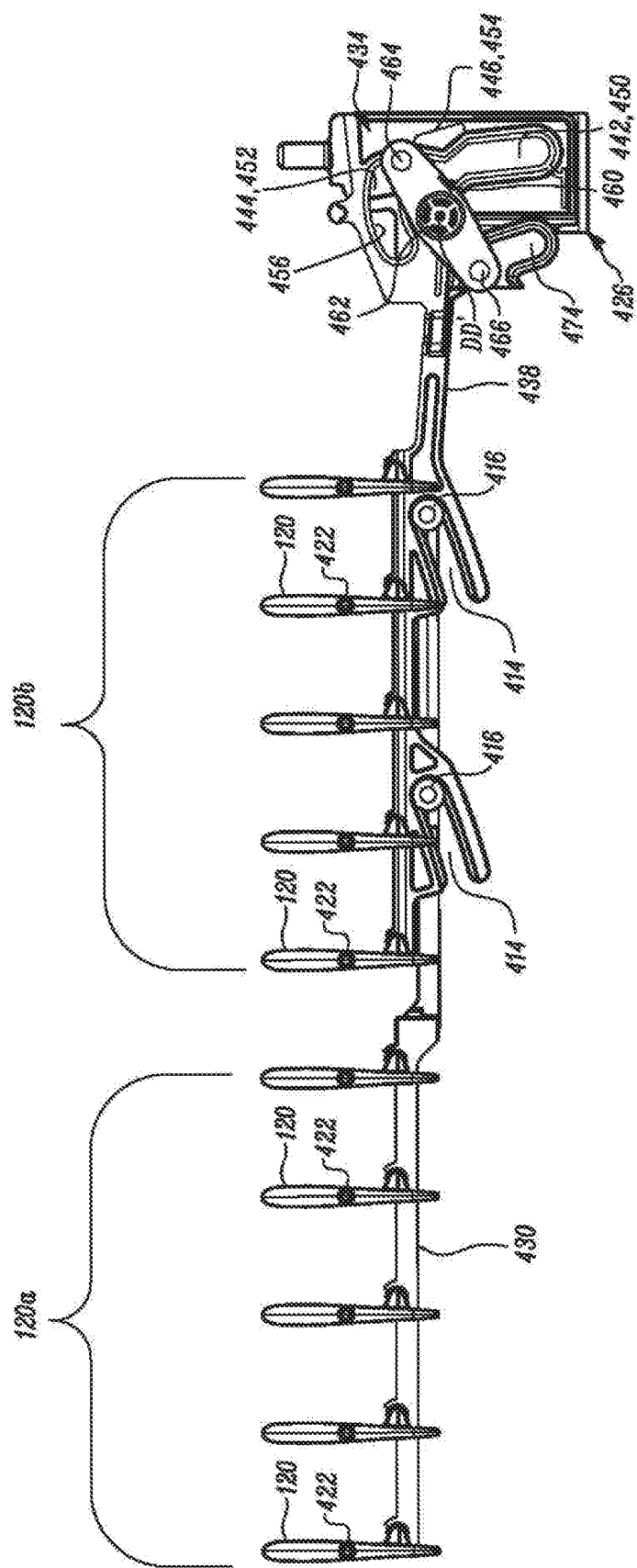
FIG. 12 illustrates a bottom view of the air vent assembly showing vanes disposed in an onward flow-guiding position according to certain embodiments of the invention.

According to other embodiments as shown in FIG. 12, when the primary pin 464 of the cam member 460 is operatively moved into engagement with the mid-portions 446, 454 of respective ones of the first and second cam grooves 440, 448 (refer to FIG. 4) so as to be located proximal to the second portions 444, 452 of respective ones of the first and second cam grooves 440, 448, a corresponding movement of the first and second actuating members 426, 434 causes respective ones of the first and second sets of flow-guiding vanes 120a, 120b to be positioned in their respective onward flow-guiding positions.

Figure 13:
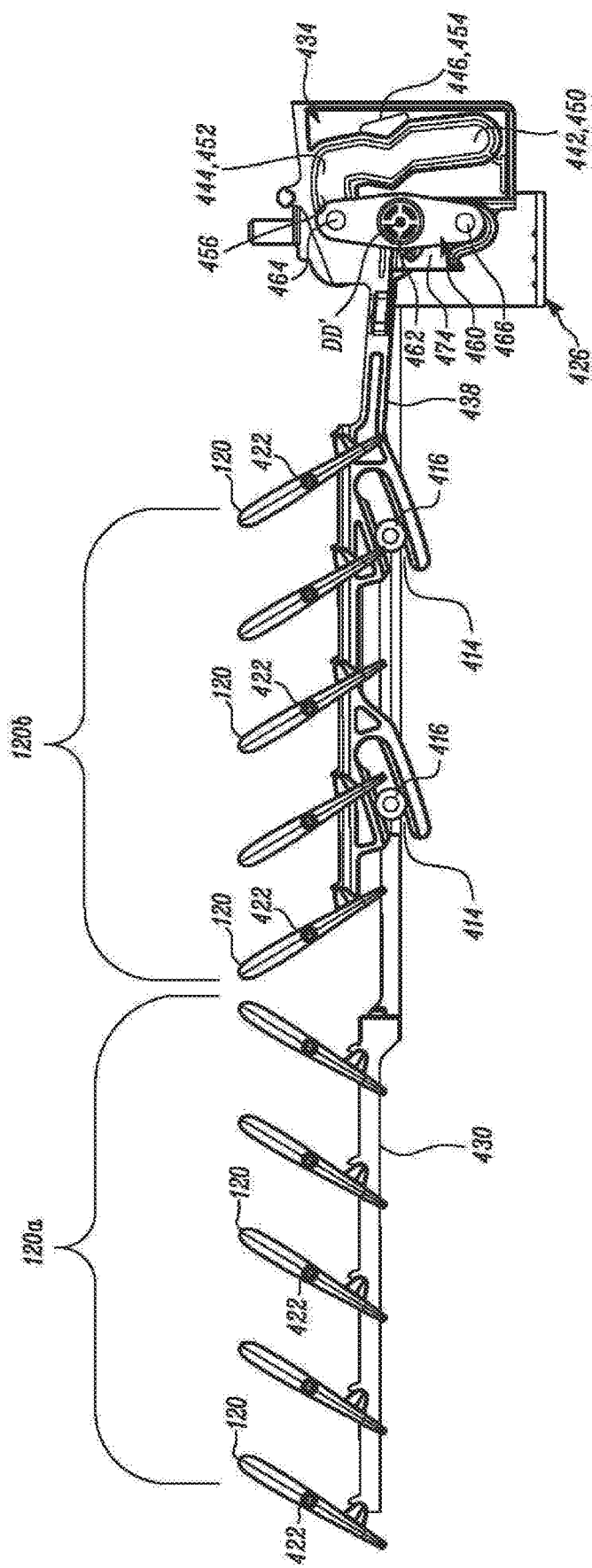
FIG. 13 illustrates a bottom view of the air vent assembly showing vanes disposed in a split flow-guiding position according to certain embodiments of the invention.

According to certain embodiments, as shown in FIG. 13, a rotation of the cam member 460 about the axis DD' of the central portion 462 causes a partially-split flow-guiding position, and if the rotation is continued further a fully-split flow-guiding position. When the primary pin 464 engages with the second portion 442 of the first cam groove 440 to be located distally away from the mid-portions 446, 454 of the first and second cam grooves 440, 448. In this instance, upon further rotation of the cam member 460, the first set of flow-guiding vanes 120b rotate about their respective rotational axes AA' towards a leftward flow-guiding position. As the second cam groove 448 comprises a third portion 456, the primary pin 464 of the rotating cam member 460 does not cause the second set of flow-guiding vanes 120a to rotate. Rather, the secondary pin 466 of the cam member 460 engages with a retainer groove 474 defined on the second base portion 436, causing the vanes 120 from the second set of flow-guiding vanes 120b to rotate about their respective rotational axes AA' towards a rightward flow-guiding position.

For the purposes of this disclosure, the rightward and leftward flow-guiding positions of respective ones of the first and second sets of flow-guiding vanes 120a, 120b from the foregoing embodiments may be regarded as a split flow-guiding position in which angular positions of respective ones of the first and second flow-guiding vanes 120 may be dissimilar from angular positions of the first and second flow-guiding vanes 120 when both of the first and second flow-guiding vanes 120 are disposed in either of the leftward flow-guiding position or the rightward flow-guiding position. The terms 'partially-split flow-guiding position' disclosed herein is used to refer to a type of the split flow-guiding position in which the first and second sets of flow-guiding vanes 120a, 120b would be disposed at a first pre-defined angle with respect to one another. The first pre-defined angle disclosed herein may be, in an example, 45 degrees between the first and second sets of flow-guiding vanes 120a, 120b. In another example, the first pre-defined angle disclosed herein may be 60 degrees. The terms 'fully-split flow-guiding position' is however, another type of the split flow-guiding position in which the first and second sets of flow-guiding vanes 120a, 120b would be disposed at a second pre-defined angle with respect to one another, the second pre-defined angle being greater than the first pre-defined angle. In an example, if the first pre-defined angle is 45 degrees, then the second pre-defined angle may be implemented by way of a 90-degree angle between the first and second sets of flow-guiding vanes 120a, 120b. In another example, if the first pre-defined angle is 60 degrees, then the second pre-defined angle may be implemented by way of a 120-degree angle.

In another embodiment, the first and second pre-defined angles may result in the two sets of vanes being asymmetric with respect to one another. By selecting pre-determined lengths of the first and second cam grooves 440, 448, and in particular, a pre-determined length of the third portion 456 of the second cam groove 448 to achieve other values of the second pre-defined angle, such values however being greater in relation to the first pre-defined angle. For example, if the first pre-defined angle is 45 degrees, then the second pre-defined angle may be implemented by way of a 60-degree angle between the first and second sets of flow-guiding vanes 120a, 120b. In another example, the first pre-defined angle may be 45 degrees while the second pre-defined angle is 120 degrees.

According to certain other embodiments of this invention, the first and second pre-defined angles corresponding to the partially and fully split-flow-guiding positions of the first and second flow-guiding vanes 120 can be pre-defined to the user interface 206 by the user. For example, the user interface 206 of the infotainment device 108 can present to the user via other menu options (not shown)—a range of values for selecting each of the first and second pre-defined angles for subsequent implementation by the processor 208 for rotating the cam member 460 via the rotary actuator 458.

Figure 14A:
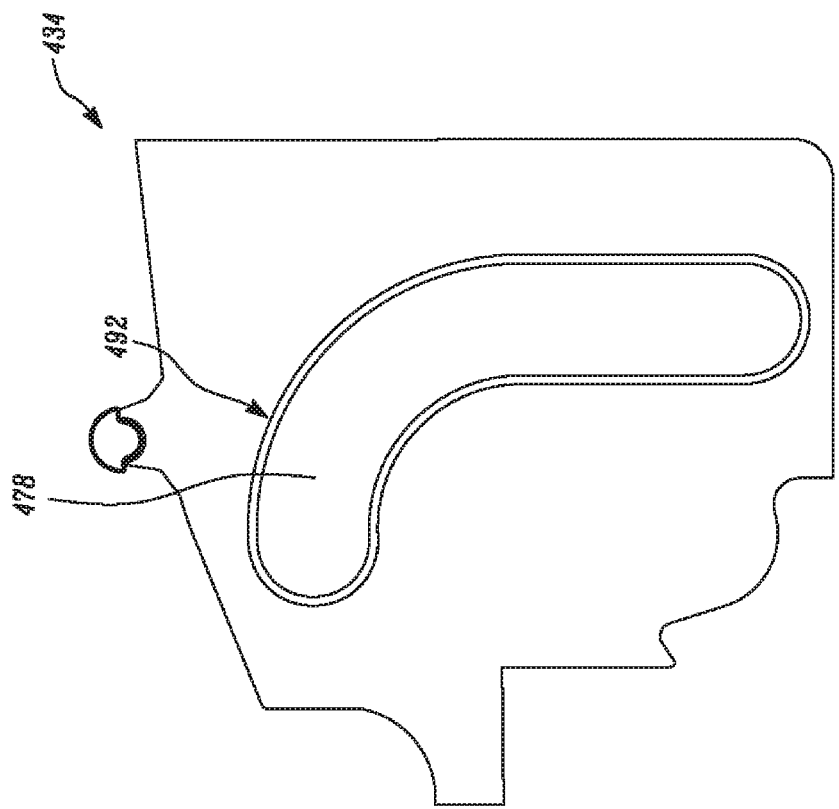
FIG. 14A illustrates a cam-groove geometries for the first and second actuating members of the air vent assembly according to certain embodiments of the invention.
Figure 14A:
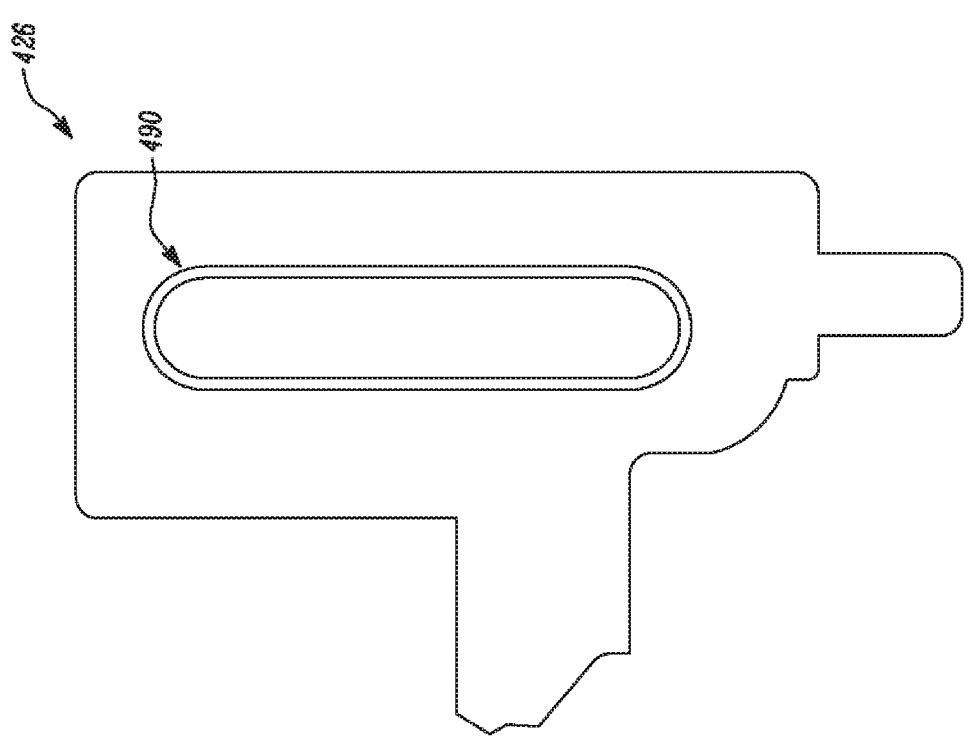

FIG. 14A illustrates cam-groove geometries for the pair of actuating members of the air vent assembly according to certain other embodiments of the invention. FIG. 14A illustrates a cam-groove geometry for the first actuating member 426 that is linear and a cam groove geometry for the second actuating member 434 that is curved so as to define a "J" shaped portion 478 therein. FIG. 14B illustrates a different set of cam-groove geometries for the pair of actuating members 426, 434 of the air vent assembly 112 according to certain embodiments of the invention. FIG. 14B illustrates a cam-groove geometry for the first actuating member 426 that that is predominantly linear but includes a bend 480 and a cam-groove geometry for the second actuating member 434 that is curved in a "J" portion 482 and also includes a bend 484 in the linear portion 486 of the cam groove. The specific geometries of the cam grooves 490, 492 defined on the first and second actuating members 426, 434 may be different according to certain embodiments of the invention.

In both of the cam-groove geometries illustrated in FIGS. 14a and 14b, a portion of the cam-groove geometries is the same, and a portion of the cam-groove geometries is different. This allows for the single cam member 460 to cause the vanes 120 from both the first and second sets of flow-guiding vanes 120a, 120b to move in the same direction when the cam member 460 engages the portion of the cam grooves that are of the same geometry and also allows the cam member 460 to move the vanes 120 such that the vanes 120 associated with the first set of flow-guiding vanes 120a are in a different direction than the vanes 120 associated with the second set of flow-guiding vanes 120b when the primary pin 464 engages with the dissimilar portions from respective cam grooves of the first and second actuating members 426, 434. This is particularly important to produce the partial and full split flow-guiding positions disclosed herein.

The specific configurations of the first and second actuating members 426, 434 described above to close the vanes 120 or move the vanes 120 from respective ones of the first and second sets of flow-guiding vanes 120a, 120b into the leftward, rightward, and split flow-guiding position is non-limiting of this disclosure. Rather, it will be acknowledged by persons skilled in the art that various other mechanisms may be used in place of the first and second actuating members 426, 434 disclosed herein without deviating from the spirit of the present disclosure.

The foregoing disclosure is not intended to limit the present disclosure to the precise forms or particular fields of use disclosed. As such, it is contemplated that various alternative embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed air vent assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

What is claimed is:

1. An air vent assembly for an HVAC system, the air vent assembly comprising:
   a cover member comprising an inlet;
   a vent extending from the inlet, the vent comprising a first set of flow guiding vanes and a second set of flow guiding vanes;
   an actuating mechanism operably coupled to each of the first set of flow guiding vanes and the second set of flow guiding vanes, the actuating mechanism comprising a rotary actuator;
   a first actuating member comprising a first link member configured to engage with each vane of the first set of flow guiding vanes;
   a second actuating member comprising a second link member configured to engage with each of the vanes from the second set of flow guiding vanes;
   a cam member having a central portion coupled to the rotary actuator; and
   a primary pin disposed at a first end of the cam member, the primary pin configured to engage with a first cam groove of the first actuating member and a second cam groove of the second actuating member such that the first set of flow guiding vanes and the second set of flow guiding vanes are capable of moving independently of one another.

2. The air vent assembly of claim 1, wherein the actuating mechanism is configured to move the first set of flow guiding vanes and the second set of flow guiding vanes independently of one another such that the first set of flow guiding vanes and the second set of flow guiding vanes are disposed in one of:
   a vane closeout position, a leftward flow guiding position, an onward flow-guiding position, a rightward flow-guiding position, a partially-split flow-guiding position wherein the first and second sets of flow guiding vanes are disposed in a first pre-defined angle relative to one another, and a fully-split flow guiding position wherein the first and second sets of flow guiding vanes are disposed in a second pre-defined angle relative to one another, the second pre-defined angle being greater than the first pre-defined angle.

3. The air vent assembly of claim 1, wherein the second link member of the second actuating member is slidably coupled to the first link member of the first actuating member, and wherein the second link member is resiliently biased by a spring coupled to the cover member.

4. The air vent assembly of claim 3, wherein each of the first and second cam grooves include:
   a first portion;
   a second portion spaced-apart from the first portion; and
   a mid-portion disposed between the first and second portions, wherein the mid-portion is curved away from an axis connecting the first and second portions.

5. The air vent assembly of claim 4, wherein the second cam groove includes a third portion extending from a distal end of the second portion, the third portion arcuately disposed in relation to the second portion.

6. The air vent assembly of claim 5, wherein the rotary actuator is configured to operatively move the first and second actuating members for rendering each of the vanes from the first and second sets of flow guiding vanes in one of:
   a vane closeout position, a leftward flow-guiding position, an onward flow-guiding position, a rightward flow-guiding position, a partially-split flow-guiding position, and a fully split flow-guiding position.

7. The air vent assembly of claim 6, wherein a rotation of the cam member about an axis of the central portion causes an engagement of the primary pin with one of the first, second, and mid-portions of respective ones of the first and second cam grooves for positioning the first and second sets of flow guiding vanes in one of:

the vane closeout position, the rightward flow-guiding position, the onward flow-guiding position, and the leftward flow-guiding position.

8. The air vent assembly of claim 7, wherein when the primary pin is operatively moved into engagement with the first portions of respective ones of the first and second cam grooves and is located distally away from the mid-portions of respective ones of the first and second cam grooves, a corresponding movement of the first and second actuating members causes respective ones of the first and second sets of flow guiding vanes to be positioned in their respective vane close-out positions.

9. The air vent assembly of claim 7, wherein when the primary pin is operatively moved into engagement with the first portion of respective ones of the first and second cam grooves so as to be located partway along a length of the first portion of respective ones of the first and second cam grooves, a corresponding movement of the first and second actuating members causes respective ones of the first and second sets of flow guiding vanes to be positioned in their respective rightward flow-guiding positions.

10. The air vent assembly of claim 7, wherein when the primary pin is operatively moved into engagement with the first portion of respective ones of the first and second cam grooves so as to be located proximal to the mid-portions of respective ones of the first and second cam grooves, a corresponding movement of the first and second actuating members causes respective ones of the first and second sets of flow guiding vanes to be positioned in their respective onward flow-guiding positions.

11. The air vent assembly of claim 7, wherein when the primary pin is operatively moved into engagement with the mid-portion of respective ones of the first and second cam grooves and is located at a center of the mid-portions of respective ones of the first and second cam grooves, a corresponding movement of the first and second actuating members causes respective ones of the first and second sets of flow guiding vanes to be positioned in their respective leftward flow-guiding positions.

12. The air vent assembly of claim 7, wherein when the primary pin is operatively moved into engagement with the mid-portion of respective ones of the first and second cam grooves so as to be located proximal to the second portions of respective ones of the first and second cam grooves, a corresponding movement of the first and second actuating members causes respective ones of the first and second sets of flow guiding vanes to be positioned in their respective onward flow-guiding positions.

13. The air vent assembly of claim 6, wherein a rotation of the cam member about an axis of the central portion causes an engagement of the primary pin with the third portion of the second cam groove so as to position respective ones of the first and second set of flow guiding vanes in one of:

the partially-split flow-guiding position and the fully-split flow-guiding position.

14. The air vent assembly of claim 13, wherein if the primary pin is selectively moved into engagement with the third portion of the second cam groove so as to be located distally away from the mid-portions of respective ones of the first and second cam grooves, the first set of flow guiding vanes is positioned in its rightward flow-guiding position and the second set of flow guiding vanes is positioned in its leftward flow-guiding position.

15. The air vent assembly of claim 1, wherein the rotary actuator is controlled by a processor operatively coupled to the rotary actuator.

16. The air vent assembly of claim 1, wherein the first set of flow guiding vanes and the second set of flow guiding vanes are independently moveable.

17. The air vent assembly of claim 1, wherein the first link member is selectively operable to pivot about each vanes corresponding rotational axis of the first set of flow guiding vanes and the second link member is selectively operable to pivot about each vanes corresponding rotational axis of the second set of flow guiding vanes.

18. A vehicle comprising:
an air vent assembly comprising:
a cover member comprising an inlet;
a vent extending from the inlet, the vent comprising a first set of flow guiding vanes and a second set of flow guiding vanes;
an actuating mechanism operatively coupled to each of the first set of flow guiding vanes and second set of flow guiding vanes, the actuating mechanism comprising a rotary actuator;
a first actuating member comprising a first link member configured to engage with each vane of the first set of flow guiding vanes; and
a second actuating member comprising a second link member configured to engage with each of the vanes from the second set of flow guiding vanes;
a cam member having a central portion coupled to the rotary actuator; and
a primary pin disposed at a first end of the cam member, the primary pin configured to engage with a first cam groove of the first actuating member and a second cam groove of the second actuating member such that the first set of flow guiding vanes and the second set of flow guiding vanes are capable of moving independently of one another.

19. The vehicle of claim 18, further comprising a dash console disposed in an anterior region of the vehicle, wherein the air vent assembly is disposed at a mid-portion of the dash console.

20. The vehicle of claim 18 further comprising an infotainment device for controlling an operation of the air vent assembly, wherein the infotainment device comprises:
a display;
one or more processors disposed in communication with the display;
a user interface defined by the display, the user interface configured to accept an input from a user;
wherein at least one of the one or more processors disposed in communication with the display is configured to cause the display to display a menu of options; and
wherein at least one of the menu options is a menu option to independently and simultaneously control a positioning of the first set of flow guiding vanes and the second set of flow guiding vanes in the air vent assembly.

* * * * *